3,395,185
LOW MOLECULAR WEIGHT STEREOREGULAR POLYOXYALKYLENE GLYCOLS

Sidney L. Reegen, Oak Park, and Kurt C. Frisch, Grosse Ile, Mich., assignors to Wyandotte Chemicals Corporation, Wyandotte, Mich., a corporation of Michigan
No Drawing. Filed Nov. 18, 1964, Ser. No. 412,235
7 Claims. (Cl. 260—615)

The present invention relates to polyoxyalkylene glycols. It is more particularly concerned with stereoregular polyoxyalkylene glycols of low molecular weight and the preparation thereof.

Stereoregular diols are of great interest in the production of polyurethanes which have advantageous properties such as a higher tensile strength at break, a higher elongation at break, and improved adhesive properties. However, such low molecular weight polyalkylene glycols have heretofore been made only with difficulty. The primary reason for this difficulty is that the standard and obvious method of preparing low molecular weight polyalkylene glycols, i.e., polymerization of alkylene oxides, does not yield satisfactory stereoregular polymers. This can be attributed to the fact that the polymerization requires the presence of a catalyst which catalyzes by acting as the base from which propagation of the oxyalkylene chain extends. Then after removal of the catalyst, the polymer has considerable monofunctionality. As a result of the above, no satisfactory low molecular weight stereoregular polyalkylene glycols have been prepared by the polymerization of alkylene oxides. The search for satisfactory methods of preparing low molecular weight stereoregular alkylene glycols continued and heretofore, as far as we know, no satisfactory method for such has been found.

It is an object of the invention to provide novel stereoregular polyoxyalkylene glycols of sufficiently low molecular weight to be suitable for use in the prepartion of useful polymers such as polyurethanes. It is an additional object to provide a method for the preparation of such polyoxyalkylene glycols.

According to the invention, a high molecular weight stereoregular polyalkylene oxide is prepared by any suitable method known in the art. The high molecular weight polyalkylene oxide is then subjected to cleavage in the presence of a strong acid, as for example sulfuric acid, water, and an organic solvent. The product obtained is a polyoxyalkylene glycol having a molecular weight in the range of about 500 to about 10,000. The average molecular weight of the final product may be controlled within this range by controlling the reaction time and other reaction conditions.

As used herein, the term "polyalkylene glycol," as for example polypropylene glycol, denotes a glycol having a plurality of repeating alkylene oxide units. The term is question, when used herein, is used synonymously with the term "polyoxyalkylene glycol," since such abbreviated use is common in the art.

The terms "stereoregular" or "stereospecific" as used herein denote polymers in which the substitutent groups on the asymmetric carbons of the repeating units are oriented either similarly above or below the plane of the polymer or alternatively above and below the plane of the polymer.

In carrying out the process of the present invention, a high molecular weight stereoregular polyalkylene oxide is prepared. Various methods and catalysts therefor are well known in the art. For example, a suitable catalyst system may comprise zinc dialkyl, aluminum trialcoholate and water. After reaction for a suitable period, a high molecular weight polymer is obtained. The high molecular weight polymer is then molecularly cleaved and hydrolyzed by reaction with a solution prepared by mixing together an acid such as concentrated sulfuric acid, an organic solvent such as isopropanol, and water. The reaction is advantageously carried out under a nitrogen atmosphere. The low molecular weight product is then separated and purified by standard procedure.

Stereoregular polyalkylene oxide.—Suitable alkylene oxides for use in the present invention are those having from three to twelve carbon atoms. Although propylene oxide is preferred, other alkylene oxides may be used, as for example epichlorohydrin, 1,2-butylene oxide, 2,3-butylene oxide, butadiene monoxide, 1,2-pentylene oxide, 2,3-hexylene oxide, 3,4-hexylene oxide, 3-ethyl-2,3-pentylene oxide, 1,2-decylene oxide, 1,2-dodecylene oxide, cyclopentene oxide, cyclohexene oxide, camphene oxide, aromatic oxides such as styrene oxide, benzylethylene oxide, and similar materials. Additionally, mixtures and copolymers of these materials may be used. Also, the stereoregular polymers may include therein a small or even a substantial amount of ethylene oxide, as long as the basic desirable properties of the stereoregular polymer are not adversely affected.

Catalyst.—Any suitable catalyst or catalyst system useful for the preparation of stereoregular polyalkylene oxides are used. A suitable catalyst composition for the preparation of polymers with an $\overline{M}_v$ ranging from about 20,000 to 1,300,000 is zinc-di-n-butyl/aluminum triisopropoxide/$H_2O$ at a 1:1:1 mole ratio (0.5 mole percent zinc based on monomer). For polymers having an $\overline{M}_v$ as high as 5,400,000 or greater, a catalyst composition with a $Zn/Al/H_2O=1.5:1:0.5$ ratio (0.75 mole percent zinc based on monomer) may be used to obtain yields in the range of about 94 percent to about 100 percent. Other suitable catalysts include ferric chloride, ferric chloride complexes and organometallic catalysts optionally activated with water, alcohols or amines.

The polyalkylene oxide starting material utilized in the present invention should have a molecular weight (based on intrinsic viscosity measurements) of at least 100,000 to about 20,000,000, and preferably in the range of about 1,000,000 to about 20,000,000. The polyalkylene oxide may be compounded with a stabilizer immediately after the polymerization process. Among the stabilizers which may be used are those of the amine type, e.g., phenyl β-naphthylamine, or phenol-type, as for example, hydroquinone monobenzyl ether. The stabilizer may be employed in any suitable range as, for example, from about 0.1 to about two percent.

Hydrolytic cleavage.—Hydrolytic cleavage of the high molecular weight stereoregular polyalkylene oxide is accomplished by reacting the polymer in an aqueous solution of a suitable acid catalyst and preferably in the presence of an organic solvent for the polymer, as for example, isopropanol. A suitable mixture comprises a mixture of isopropanol and water having a 9:1 weight ratio, to which the catalyst and the polymer may be added.

The catalyst used for hydrolytic cleavage of the high molecular weight stereoregular polymer must be one which can perform both designated functions, that is, the cleavage of the molecular structure of the polymer to a lower molecular weight within the desired range, as well as hydrolysis to add hydroxy groups to the terminal portions of the molecule. Among suitable catalysts are the strong mineral acids such as sulfuric acid, hydrochloric acid, nitric acid, phosphoric acid, and phosphorous acid. Additionally, organic acids with dissociation constants higher than about $10^{-3}$, such as chloracetic acid or trichloroacetic acid, may be used. Of the acids listed, sulfuric acid is preferred since its use results in a higher glycol content in the final product. The amount of catalyst used in the hydrolytic cleavage may be varied but is usually from about 0.5 to 25 percent by weight based upon the weight of polymer used. The preferred amount is about five percent.

Among other suitable water-soluble solvents in addition to isopropanol are dioxane, methanol and ethanol. The solvent need only be aprotic, that is, inert to both the reactants and reaction products under the conditions of reaction, but is preferably also water-soluble or at least water-miscible to provide a solvating solvent for the high molecular weight polymer. Antioxidants may also be used in the reaction to prevent undesirable oxidation, and such may be 2,6-di-tertiary butyl para-cresol, hydroquinone monobenzyl ether, octylated diphenylamine, phenyl-$\beta$-naphthylamine, or diphenyl para-phenylenediamine, or the like. The reaction is preferably conducted under an inert atmosphere, e.g., a nitrogen atmosphere.

The temperature and time of the hydrolytic reaction may vary considerably, depending upon the organic solvent employed, if any, to dissolve the polymer and the particular catalyst selected. For example, using isopropanol as the solvent and sulfuric acid as the catalyst, the reaction occurs at reflux temperature (about 85° C.) for about 40 hours. Generally, the most important variable will be the solvent used since the reaction will be carried out at its reflux temperature. The temperature of the reaction will generally be the reflux temperature of the solvent, which in turn will be determinative of the time of the reaction. Obviously, the higher the reflux temperature the lesser the time required to insure complete reaction.

The following preparations are given by way of illustration only and are not to be construed as limiting.

Preparations 1–3.—Stereoregular polyalkylene oxides

In each case, the designated materials were polymerized in a 50 percent benzene solution at 65° C. for 48 hours, obtaining the yields indicated. The resulting polymers were dissolved in benzene and washed with dilute hydrochloric acid and water to remove residual catalyst. The benzene was then removed by distillation under reduced pressure to yield a high molecular weight stereoregular polypropylene oxide. The data for these preparations are presented in Table I above.

Preparations 5–6

Styrene oxide and epichlorohydrin are polymerized in the presence of ferric chloride to obtain high molecular weight polyalkylene oxides.

Examples 1–12.—Preparation of stereoregular low molecular weight polypropylene glycols The following examples, the data for which are presented in Table II, are given by way of illustration only and are not to be construed as limiting. In each example, the polymer was hydrolytically cleaved by treatment in solution in isopropanol with the stated amount of catalyst based on the polymer. Unless otherwise stated, the reaction was performed under a nitrogen atmosphere in the presence of 0.17 percent Ionol (2,6-ditertiary butyl para-cresol) as an antioxidant at reflux temperature of the mixture for about 40 hours. The cleaved polymer was separated by adding benzene to the mixture and washing out the residual catalyst with a ten percent solution of sulfuric acid and water until aluminum could no longer be detected in the wash solution. The benzene was removed from the purified polymer solution by distillation at atmospheric pressure in order to remove distilled water as a benzene/water azeotrope. The residue was redissolved in benzene and the water removed by azeotropic distillation to assure complete dryness of the remaining polymer. Traces of solvent were removed by heating the material to 70° C. at high vacuum (one millimeter of mercury or less). Yields of up to 100 percent (based on the high molecular weight polypropylene oxide) of hydrolytically cleaved polymer were obtained. Infrared absorption data showed the absence of carbonyl groups and unsaturation.

Following the general procedure described in the above examples, the products prepared in Preparations 4–6 are hydrolytically cleaved to low molecular weight polyoxyalkylene glycols.

TABLE I.—PREPARATION OF HIGH MOLECULAR WEIGHT POLYPROPYLENE OXIDE

| Preparation | 1 | 2 | 3 |
| --- | --- | --- | --- |
| Catalyst system | Al(i-$C_3H_7$O)$_3$/ZnCl$_2$/H$_2$O | Zn(n-$C_4H_9$)$_2$/CH$_3$OH | Zn(n-$C_4H_9$)$_2$/Al(i-$C_3H_7$O)$_3$/H$_2$O |
| Mole ratio | 3:2:1 | 1:2 | 1:1:1 |
| Catalyst concentration, based on monomer. | 0.4 mole percent Al | 1 mole percent Zn | 0.5 mole percent Zn. |
| Reaction temperature/time | 65° C./48 hours | 65° C./48 hours | 65° C./48 hours. |
| Yield, percent | 88 | 70 | 100. |
| $\overline{M}_v$ | 95,000 | 350,000 | 1,300,000. |

Preparation 4

Following the general procedure described above, 1,2-butylene oxide was polymerized in the presence of a catalyst system comprising one mole percent zinc-di-n-butyl, 0.5 mole percent aluminum triisopropoxide and 0.5 mole percent water. A white solid of molecular weight of 800,000 (on basis of intrinsic viscosity using the same intrinsic viscosity-molecular weight relationship as for propylene oxide) was prepared.

In order to compare the suitability of the present low molecular weight stereoregular polyalkylene glycols, polyurethane films were prepared by reacting PR-960 with the polyalkylene glycol produced in Example 3 and standard polyglycols used commercially for the preparation of polyurethane films. (PR-960 is the TDI prepolymer of TP2540 which is the propylene oxide adduct of trimethylolpropane having a molecular weight of ca. 2500.) In each case, the polyglycol was reacted with PR-960 at an NCO/OH ratio of 1:1.2. A film was prepared and applied to aluminum panels. The physical data obtained in tests of the film are listed below in Table III.

TABLE II.—HYDROLYTIC CLEAVAGE OF HIGH MOLECULAR WEIGHT POLYPROPYLENE OXIDE

| Example | 1 | 2 | 3 | 4 | 5 | 6 | 7 | 8 | 9 | 10 | 11 | 12 |
| --- | --- | --- | --- | --- | --- | --- | --- | --- | --- | --- | --- | --- |
| Starting Material Product of Preparation | 1 | 1 | 1 | 1 | 2 | 2 | 2 | 2 | 3 | 3 | 3 | 3 |
| Catalyst concentration, based on polymer, percent | [1]5 | [2]3 | [3]5 | [4]8 | [1]5 | [1]6 | [2]4 | [3]4 | [1]5 | [3]5 | [4]10 | [4]10 |
| Concentration, percent water based on polymer | 47 | 47 | 45 | 44 | 47 | 45 | 50 | 43 | 47 | 45 | 43 | 49 |
| Concentration of polymer in isopropanol, percent | 15 | 15 | 15 | 12 | 15 | 15 | 15 | 11 | 15 | 12 | 10 | 14 |
| Concentration of antioxidant based on polymer | [5]0.17 | [5]0.1 | [5]0.1 | [5]0.1 | [5]0.17 | [6]0.1 | [6]0.005 | [6]0.05 | [5]0.17 | [6]0.1 | [6]0.05 | [6]0.1 |
| Reaction time, hours | 40 | 40 | 35 | 45 | 40 | 45 | 40 | 50 | 40 | 48 | 52 | 54 |
| Yield, percent | 90 | 95 | 92 | 87 | ca. 100 | 93 | 89 | 94 | 69 | 90 | 91 | 87 |
| Ash content, percent | 0.04 | 0.03 | 0.04 | 0.05 |  | 0.05 | 0.02 | 0.02 | 0.002 | 0.01 | 0.02 | 0.04 |

[1] $H_2SO_4$.  [2] HCl.  [3] $H_3PO_4$.  [4] Trichloracetic acid.  [5] 2,6-di-t-butyl p-cresol.  [6] Phenyl-B-naphthylamine.

TABLE III

| Sample | Tensile Strength, p.s.i. | Elongation at Break, percent | Modulus 100 Percent, p.s.i. |
|---|---|---|---|
| Example 3 [1] | 660 | 350 | 150 |
| P-3010 [2] | 151 | 150 | 139 |
| P-2010 [3] | 305 | 170 | 188 |

[1] A polyoxypropylene glycol of molecular weight about 3,000.
[2] P-3010 is a polyoxypropylene glycol of molecular weight about 3,000.
[3] P-2010 is a polyoxypropylene glycol of molecular weight about 2,000.

It is apparent that the polyurethane prepared from the stereoregular polyalkylene glycol of Example 3 has a higher tensile strength and higher breaking elongation (indicating greater toughness) than either of the normal glycols. The higher modulus is also indicative of the influence of glycol stereoregularity on the properties of the polyurethane. Peel strength determinations on the three coatings, from aluminum panels, showed the stereoregular glycol to produce polyurethanes with improved adhesion to aluminum.

In the foregoing polyurethane example, hexamethylene diisocyanate, toluene diisocyanate, polyarylene polyisocyanate, and 4,4'-diphenylmethane diisocyanate, among others, can also be used instead of PR-960 with equivalent results.

Although this invention has been described in connection with the hydrolytic cleavage of high molecular weight stereoregular polyalkylene glycols, it is also possible to carry out this invention by hydrolytically cleaving high molecular weight steroregular triols, tetrols and other higher polyols. Thus, stereoregular polyols such as those formed by the reaction of alkylene oxides with pentaerythritol or trimethylolpropane may be hydrolytically cleaved in accordance with this invention to low molecular weight, stereoregular polyalkylene glycols. If these polyols are employed, one molecule of a polyol will be prepared along with the low molecular weight polyalkylene glycols. However, this amount is insignificant when considered along with the amount of polyalkylene glycol prepared and has no effect on the efficacy of the thus-prepared glycol. Furthermore, if higher polyols are cleaved in accordance with this invention, the molecular weight of the polyol may be as low as about 50,000 and satisfactory stereoregular low molecular weight glycols may still be prepared.

It is to be understood that the invention is not to be limited to the exact details of operation or exact compounds and compositions shown and described, as obvious modifications and equivalents will be apparent to one skilled in the art, and the invention is, therefore, to be limited only by the scope of the appended claims.

We claim:
1. A method for the production of a stereoregular polyalkylene glycol having a molecular weight up to a maximum of about 10,000, which comprises mixing and reacting together in the presence of water a stereoregular polymer, having a molecular weight of at least about 100,000, of an alkylene oxide having three to twelve carbon atoms, inclusive, with a strong acid having a dissociation constant of at least about $10^{-3}$ in an amount of 0.5 to 25 percent by weight based upon the weight of polymer used, in an organic solvent for the starting polymer at the reflux temperature of the solvent employed, to hydrolytically cleave said polymer.

2. A method according to claim 1, wherein said strong acid is sulfuric acid.

3. A method according to claim 1, wherein said alkylene oxide is propylene oxide.

4. A method according to claim 1, wherein the reaction is conducted in the presence of an antioxidant.

5. A method according to claim 1, wherein the reaction is conducted under an inert atmosphere.

6. A method for the production of a stereoregular polyalkylene glycol having a molecular weight of about 500 to about 10,000 which comprises mixing and reacting together in the presence of water a stereoregular polymer, having a molecular weight of about 100,000 to about 10,000,000, of an alkylene oxide having three to twelve carbon atoms, inclusive, with sulfuric acid in an amount of 0.5 to 25 percent by weight based upon the weight of polymer used, in an organic solvent for the starting polymer at the reflux temperature of the solvent employed, to hydrolytically cleave said polymer.

7. A method according to claim 6 wherein said organic solvent is isopropanol.

References Cited
UNITED STATES PATENTS

| | | | |
|---|---|---|---|
| 2,990,396 | 6/1961 | Clark et al. | 260—615 |
| 3,000,963 | 9/1961 | Speranza | 260—615 |
| 3,127,358 | 3/1964 | Hill | 260—615 |
| 3,127,371 | 3/1964 | Garty et al. | 260—615 |
| 3,149,083 | 9/1964 | Gmitter. | |
| 3,192,173 | 6/1965 | Merrall et al. | 260—2 |
| 3,205,269 | 9/1965 | Friedman | 260—611.5 |
| 3,236,810 | 2/1966 | Leverett et al. | |

FOREIGN PATENTS

| | | |
|---|---|---|
| 641,052 | 5/1962 | Canada. |
| 639,654 | 3/1964 | Belgium. |

OTHER REFERENCES

Osgan et al.: Jour. of Polymer Sci., vol. 34, pp. 153–156 (1959).

Price et al.: Jour. Amer. Chem. Soc., vol. 78, pp. 4787–92 (1956).

Burwell, Chemical Reviews, vol. 54, pp. 622–635 and 638–639 (1954).

BERNARD HELFIN, *Primary Examiner.*

H. T. MARS, *Assistant Examiner.*